(12) United States Patent
Niemitalo

(10) Patent No.: US 6,996,228 B1
(45) Date of Patent: Feb. 7, 2006

(54) MOTOR FOR GENERATING VIBRATIONAL SIGNAL

(75) Inventor: Paavo Niemitalo, Kello (FI)

(73) Assignee: Nokia Mobile Phones, Ltd., Espoo (FI)

( * ) Notice: Subject to any disclaimer, the term of this patent is extended or adjusted under 35 U.S.C. 154(b) by 0 days.

(21) Appl. No.: 09/266,081

(22) Filed: Mar. 10, 1999

(51) Int. Cl.
*H04M 1/00* (2006.01)

(52) U.S. Cl. ............ 379/374.03; 379/372; 379/373.01; 379/418

(58) Field of Classification Search ................ 379/372, 379/373.01, 374.03, 418

See application file for complete search history.

(56) References Cited

U.S. PATENT DOCUMENTS

| | | | |
|---|---|---|---|
| 4,980,590 A | 12/1990 | Taniguchi et al. | 310/81 |
| 5,027,025 A | 6/1991 | Saneshige et al. | 310/156 |
| 5,175,459 A | 12/1992 | Danial et al. | 310/81 |
| 5,373,207 A | 12/1994 | Yamaguchi et al. | 310/81 |
| 5,452,354 A | 9/1995 | Kyronlahti et al. | 379/375 |
| 5,793,133 A | 8/1998 | Shiraki et al. | 310/81 |
| 5,801,466 A | 9/1998 | Odagiri et al. | 310/81 |

FOREIGN PATENT DOCUMENTS

WO    WO99/01849    1/1999

*Primary Examiner*—Jefferey F. Harold
(74) *Attorney, Agent, or Firm*—Perman & Green, LLP

(57) ABSTRACT

A vibrator mechanism is constructed with a permanently magnetized rotor having an eccentrically positioned center of mass and a flat profile. The magnetized rotor is magnetically coupled to a electrically commutated stator having multiple windings. The vibrator mechanism is assembled for compact mounting within the housing of a communication device.

8 Claims, 3 Drawing Sheets

MOTOR FOR GENERATING VIBRATIONAL SIGNAL

BACKGROUND OF THE INVENTION

Many of today's personal communicating devices employ a silent indication when a call or message is incoming. The indicator is generally a vibration which is transmitted by the appliance in response to the incoming signal. It is necessary that the vibration be sufficiently strong so that it will not go unnoticed. To generate the signal an electrical motor is constructed with a rotating shaft on which is mounted an eccentrically mounted mass. As the shaft rotates, the unbalanced mass generates a vibration that is proportional to the speed and torque of the motor as well as the eccentricity and mass of the rotor. Since these devices are to used in mobile, hand held appliances, power is at a premium in order to allow long periods between charges. In addition weight is a significant factor. Prior attempts to provide an efficient, but strong vibrating signal, involved ironless rotors having windings with brush type commutators. An eccentric mass is mounted on the shaft in addition to the rotor. The use of a brush commutator could generated sparks which would be undesirable in certain conditions and cause communications interference. The use of the external eccentric mass increases the size of the vibrator element and creates difficult mounting problems.

It is a purpose of this invention to design a low profile light weight vibrating motor which generates a strong vibrating signal at low power. The motor of this invention is integrated into the cover of the communicator appliance and can be easily controlled.

SUMMARY OF THE INVENTION

A vibrator mechanism is constructed based on a multicoil stator which forms the main structure of the mechanism. The stator is formed of a thin cylindrical or pancake shape. A rotor is mounted for rotation on the stator and is formed of a thin sector shaped disc of preferably 180° or less. The rotor and eccentric mass are combined into an integral unit which is constructed of a ferromagnetic material and is permanently magnetized with at least two opposing magnetic poles. The rotor is shaped to nest conveniently on the stator thereby providing a streamlined vibrator mechanism which can be contained within a compartment molded into the housing of the appliance. The vibrator mechanism is positioned within the housing at an extremity thereof which is furthest from the center of gravity of the communication device. The motor driver is constructed into the ASIC of the appliance and generates pulses to the stator coils. As the stator coils are energized the poles of the rotor are alternatingly repulsed and attracted to start a rotation which becomes self supporting. Rotation causes vibration to signal the user.

DESCRIPTION OF THE DRAWING

The invention of this application is described in more detail below with reference to the Drawing in which.

DESCRIPTION OF THE PREFERRED EMBODIMENT

Figure 1:
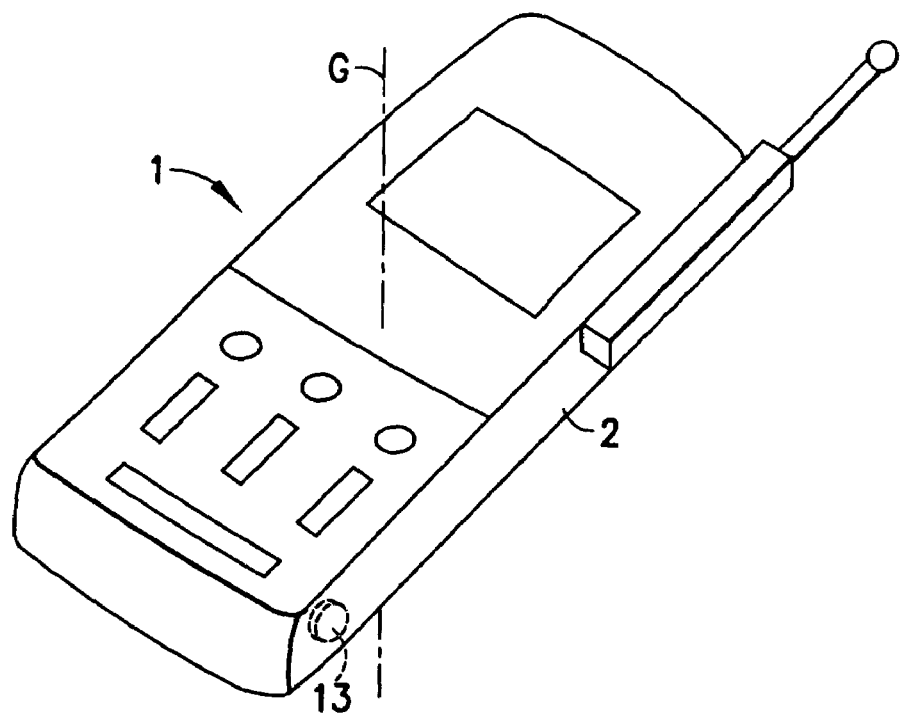
FIG. 1 is a top, front and side view of the rotor of this invention.

A communicating appliance 1 is shown in FIG. 1 having a housing 2. Housing 2 is constructed of molded plastic with appropriate internal compartments molded in its interior. The appliance 1 can be a cellular phone, beeper or other similar device. It is desired that a means be provided to alert the user to an incoming call or message without using an audible ring or buzzer. A vibrator mechanism 3 generates a physical signal that is felt by the user to indicate that the communication appliance 1 is activated for some purpose.

As best shown in FIGS. 2 through 5, the vibrator mechanism 3 of this invention consists of a stator 4 and a rotor 5. The stator 4 is a flat disc shape element which contains windings 6–11 wound on posts 23 which extend outward from the plane of the stator 4. The windings 6–11 are connected to the output of controller 12 as shown in FIG. 6. The stator 3 is mounted in a compartment 13 integrally molded in the interior of housing 2. In order to enhance the effects of the vibration generated by the mechanism 3, the compartment 13 is positioned in the housing at a maximum distance from the center of gravity G of the appliance 1. A cylindrical bore 14 is constructed along the axis 17 of the stator 4 and is closed at its outer end 15. A bearing 16 is mounted in the bore 14 to receive the rotor for rotation about the axis 17.

Figure 8:
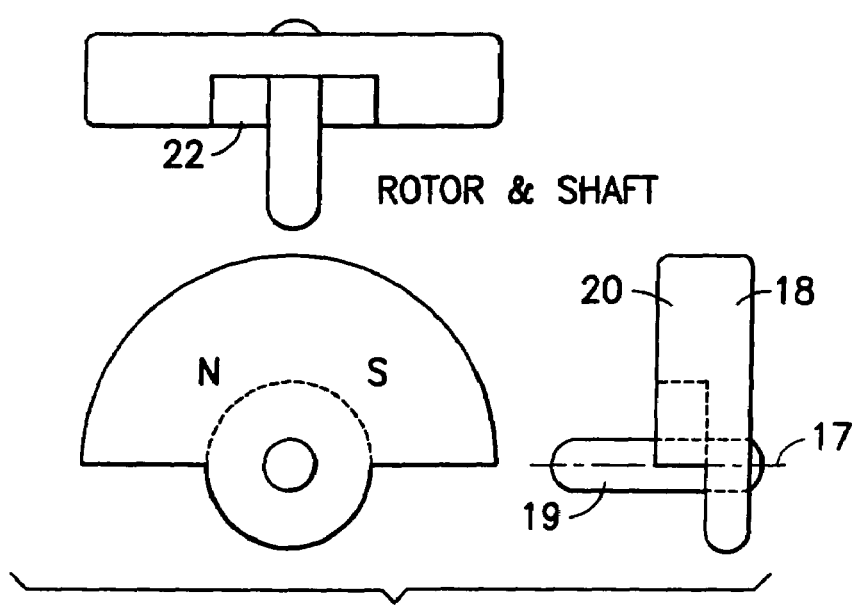
FIG. 8 is a series of views of the rotor of this invention.
Figure 2:
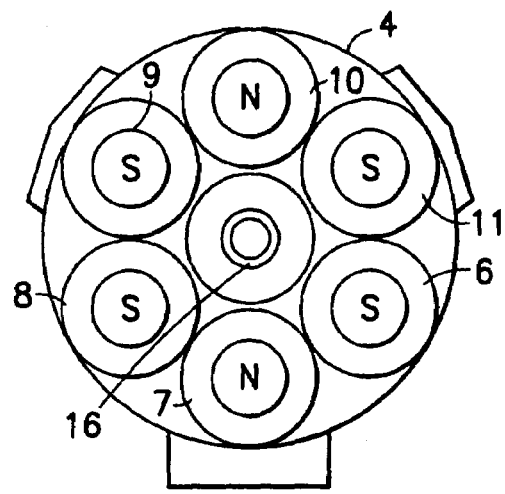
FIG. 2 is a top view of the stator of this invention.
Figure 3:
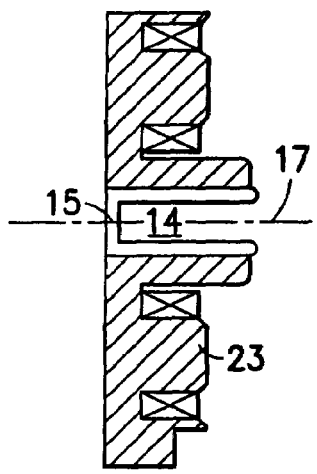
FIG. 3 is a side view of the stator of this invention.
Figure 4:
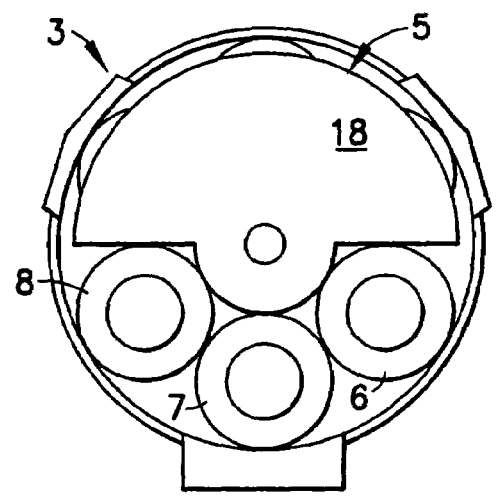
FIG. 4 is a top view of the vibrator assembly of this invention.

The rotor 5 consists of a disc 18 and a shaft 19 integrally connected with the disc 18 extending transverse to the shaft 19. Shaft 19 is sized to fit into the bearing 16 for rotation therein. As shown in FIG. 8, the rotor disc 18 is made up of magnetic material which is permanently magnetized having a north pole (N) and south pole(S). The disc 18 is formed in the shape of a thin cylindrical sector of approximately 180° or less. It is desirable to construct the rotor having a thin profile for compact assembly with the stator. A disc shaped sector having a diameter of approximately 12 mm and a thickness of approximately 3 mm will work depending on the weight of the material used. Depending on the space available, the center of mass of the rotor may be several mm from the axis of rotation 17. An overall rotor weight of 1 to 3 grams would provide a signal that would be clearly noticed.

Since the rotor 5 is not a full cylindrical disk, the center of mass 20 of the disc 18 is eccentric to the rotational axis of the rotor 5. This imbalance will generate vibrational forces in the mechanism 3 as the rotor 5 spins, thereby creating the physical sensation which signals the user. In this manner the separate rotor and eccentric mass of prior art vibration generating devices is combined into an integral element.

Figure 5:
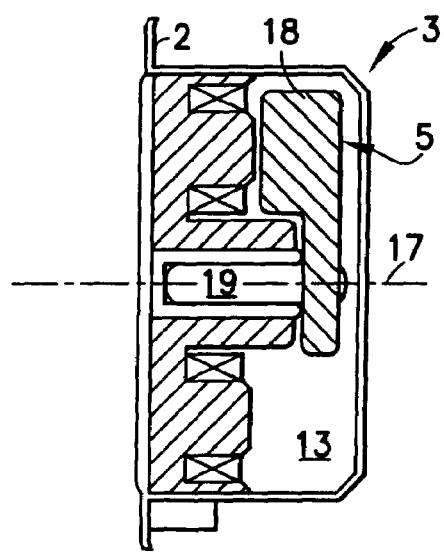
FIG. 5 is an side view of the vibrator assembly of this invention.
Figure 6:
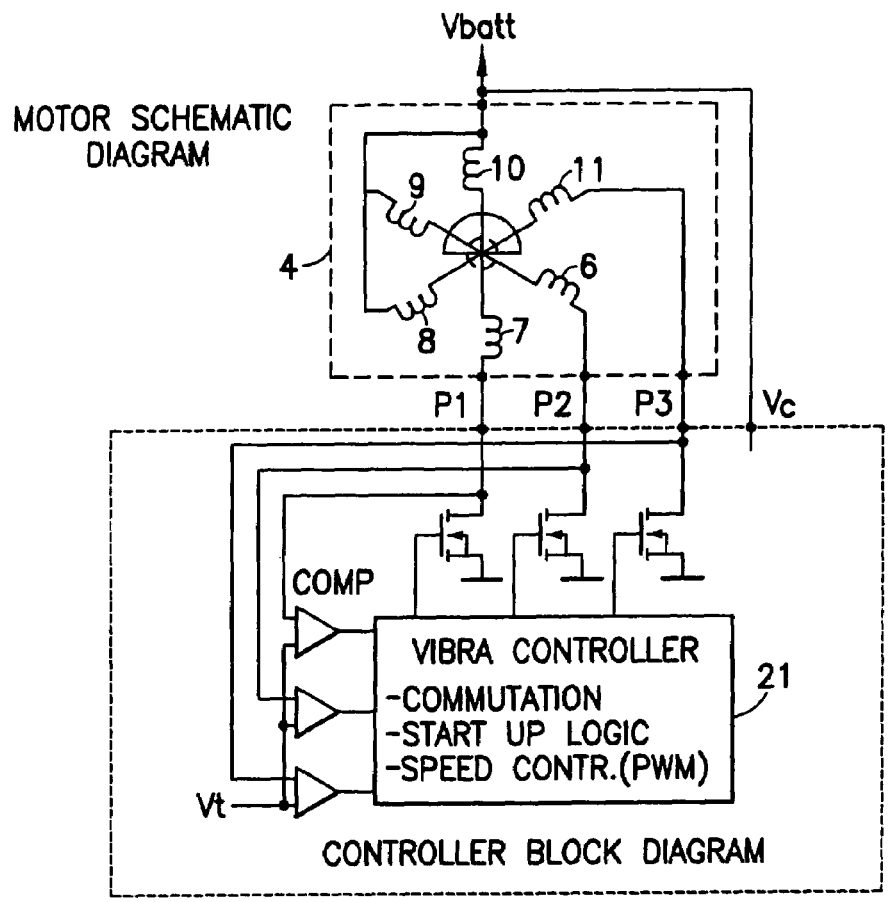
FIG. 6 is a block diagram of the control circuit for the vibrator of this invention.
Figure 7:
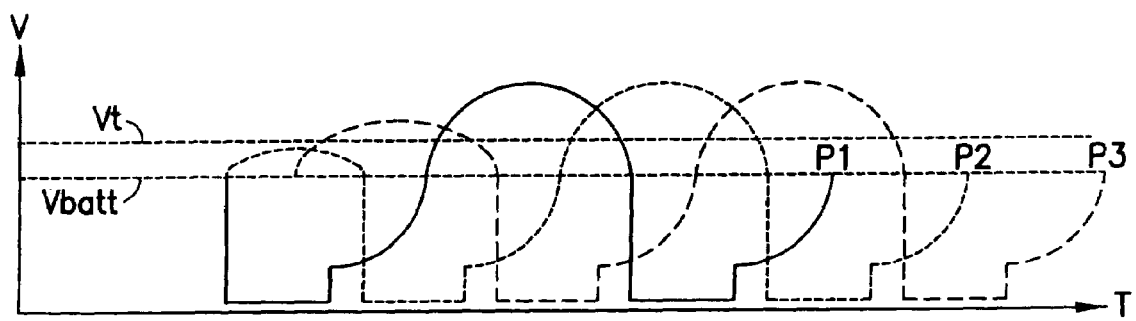
FIG. 7 is a graph of the input voltage including back emf to the stator of this invention.

As shown in FIG. 5, because of the flat disc shaped, cooperating profiles of both the stator 4 and rotor 5, the assembly of the vibrator mechanism 3 fits compactly in to compartment 13 of housing 2. No separate enclosure is needed for the vibrator mechanism 3. The rotor 5 is constructed with a semicylindrical recess 22 to enhance the nesting of the rotor 5 with the stator 4. This construction allows close magnetic coupling of the permanently magnetized rotor 5 with the poles of the stator windings, while providing sufficient support of rotor shaft 19 within stator bore 14.

In the prior motors used for this purpose the windings were limited by virtue of the space constraints of the rotor. This resulted in an inability to take advantage of the availability of the increased voltages beyond around 3.6 volts. Newer batteries provide voltages in the range of 3.6 to 6 volts. The vibrator system of this invention, using the permanently magnetized rotor 5 and stator mounted windings 6–11, enables the use of a greater number of turns in the windings. This makes the device of this invention more efficient and permits the use of higher voltages. For example, an embodiment of this invention uses 100 to 200 turns per pole of a 0.05 mm diameter wire. This reduces the size of the permanent magnets needed and power consumption.

In operation, the stator windings 6–11 are energized to sequentially present rotating opposing polarities to the magnetized rotor 5. This causes rotation of the rotor according to well known principals. Controller 21 is constructed as part of the integrated circuit for the appliance 1 and is designed to generate a vibrator drive signal $V_t$ in response to an incoming call or other signal. The signal $V_t$ is a pulse modulated chain of signals having a set value which will initiate rotation of the rotor 5. As the rotor 5 spins, a back emf will be generated within the windings by the interaction of the stator and rotor magnetic fields. The back emf is added to the input signal and serves to sustain the rotation of the rotor. Commutation is accomplished by sequencing the signals to the windings 6–11 in a manner well known in the art. The performance of this type of motor will provide further reduction of power consumption.

In this manner a vibrator motor is constructed for use with a communication device that combines a permanent magnet eccentric mass rotor driven with an electrically commutated stator to enhance performance while reducing size and weight. This configuration also facilitates microprocessor control and reduces power consumption.

I claim:

1. In a communicator appliance, a device for generating a vibration to provide a signal to the user, said signal indicating incoming communications comprising:
   a housing for enclosing components of the appliance, said housing having a separate compartment constructed therein to accommodate a vibration generating device;
   a stator mounted in the separate compartment having means to receive a rotor for rotation thereon about an axis, said means to receive the rotor further comprising:
   an upstanding post having an axially extending bore therein;
   a pin extending downward from a rotor at an axis of rotation; and
   wherein, in the assembled position, said pin is inserted into said bore for axial rotation of said rotor on said stator;
   a plurality of windings mounted and circumferentially spaced on the stator, each of said windings having means to connect a voltage thereto;
   wherein said rotor is mounted for rotation on the stator within the separate compartment, said rotor constructed of a permanently magnetized material, said rotor being further formed and mounted for magnetic coupling with the stator coils, said rotor constructed in the form of a substantially flat disc of less than a fully cylindrical shape to position its center of mass eccentric to the axis of rotation;
   a controller connected to a voltage source and constructed to sequentially supply a series of drive pulses to the stator windings by electrical commutation, so as impart rotation to the permanent magnet rotor in response to the incoming communication; and
   wherein the stator and rotor are assembled in a compact operative relation and mounted within the compartment.

2. In a communicator appliance, a device for generating a vibration to provide a signal to the user, said signal indicating incoming communications as described in claim 1 wherein the rotor is shaped in the form of a sector of a disc encompassing 180° or less.

3. In a communicator appliance, a device for generating a vibration to provide a signal to the user, said signal indicating incoming communications as described in claim 2 wherein the rotor is constructed with a recess to allow close mechanical and magnetic cooperation with the stator.

4. In a communicator appliance, a device for generating a vibration to provide a signal to the user, said signal indicating incoming communications as described in claim 1 wherein the windings comprise at least 100 turns of wire.

5. In a communicator appliance, a device for generating a vibration to provide a signal to the user, said signal indicating incoming communications as described in claim 1 wherein the controller is constructed as part of an integrated circuit control system for the communicator appliance.

6. In a communicator appliance, a device for generating a vibration to provide a signal to the user, said signal indicating incoming communications as described in claim 1 wherein the voltage source has a value of 3.6 volts or higher.

7. In a communicator appliance, a device for generating a vibration to provide a signal to the user, said signal indicating incoming communications as described in claim 1 wherein the compartment for accommodating the vibration generating device is constructed in the housing at the furthest available position from the center of gravity of the appliance.

8. In a communicator appliance, a device for generating a vibration, according to claim 1, further comprising a recess, constructed in the rotor to receive the post and provide close mechanical and magnetic cooperation with the stator.

* * * * *